United States Patent

[11] 3,627,649

[72] Inventor John P. Hogan
 Bartlesville, Okla.
[21] Appl. No. 832,451
[22] Filed June 11, 1969
[45] Patented Dec. 14, 1971
[73] Assignee Phillips Petroleum Company

[54] PRODUCTION OF ELECTROPLATABLE POLYMERS
 7 Claims, No Drawings
[52] U.S. Cl.......................................................... 204/30
[51] Int. Cl........................................................ C23b 5/62
[50] Field of Search........................................... 204/30, 20;
 260/683.1, 683.15 R; 117/47 R, 213

[56] References Cited
UNITED STATES PATENTS

| | | | |
|---|---|---|---|
| 2,827,444 | 3/1958 | Cines............................ | 260/683.15 R |
| 3,235,426 | 2/1966 | Bruner.......................... | 204/30 |
| 3,347,724 | 10/1967 | Schneble et al............... | 204/30 |

FOREIGN PATENTS

| | | | |
|---|---|---|---|
| 575,702 | 5/1959 | Canada......................... | 260/683.15 R |

Primary Examiner—John H. Mack
Assistant Examiner—W. I. Solomon
Attorney—Young and Quigg ABSTRACT: A method of producing an improved electroplatable polymer by incorporating a support material in the polymer upon its formation within specific concentrations, this being accomplished by regulating the productivity of the supported catalyst employed.

PRODUCTION OF ELECTROPLATABLE POLYMERS

This invention relates to olefin polymers.

In one of its more specific aspects, this invention relates to the production of electroplatable olefin polymers.

The production of olefin polymers is well known. In the solution process the polymer is recovered in a liquid solution; in the particle-form process, the polymer is recovered in the form of a slurry of polymer particles in the reaction medium in which it is produced. Both processes involve polymerization of at least one olefin at a polymerization temperature up to 500° F. with a catalyst supported on silica support or supports such as alumina, zirconia, thoria or their combinations. Frequently, the catalyst is a supported and activated chromium oxide. Such polymerization processes are useful for the polymerization of ethylene, propylene, 1-butene, 1-pentene, 1-hexene, 1-octene, and the like, the polymer product being either a homopolymer or a copolymer or terpolymer in which ethylene is a major monomer.

The polymers produced are widely used. However, their usage would be extended if they were less difficult to electroplate by conventional methods.

The method of this invention provides a process for producing an improved electroplatable polymer. According to the method of this invention there is provided a process for producing an electroplatable olefin polymer which comprises polymerizing the olefin with a supported catalyst containing at least one but less than 1000 p.p.m. chromium oxide, calculated as the metal although present as the oxide, at a limited productivity of the polymer in relation to the weight of the catalyst employed, recovering a polymer having contained therein a suitable amount of the catalyst support, treating the polymer so produced to prepare its surface for electroplating and electroplating the polymer.

In one embodiment of this invention the polymer is prepared in a so-called "particle-form process" carried out under conditions wherein the polymer is recovered in the form of solid particles from the medium in which the reaction is conducted.

Accordingly, it is the object of this invention to provide an electroplatable polymeric composition.

It is another object of this invention to provide a polymeric composition which has wide commercial utilization.

The olefin polymers of the present invention are prepared according to solution and particle form methods described in U.S. Pat. No. 2,825,721 and/or British Pat. No. 853,414, respectively. Polymers of ethylene and copolymers containing ethylene are preferred because they have high density and form rigid articles. The supported chromium oxide catalysts employed are of limited productivity; that is, the amount of chromium oxide associated with the support component will be relatively low, being less than 1000 p.p.m. based on the weight of the support component. After polymerization, the polymer is conventionally recovered but without removal of the catalyst residue.

The polymer produced by the process of this invention thus will have incorporated in it upon its formation a certain concentration of the support, that is, of the silica, alumina, zirconia, thoria, or a combination of these materials, preferably silica or silica-alumina, these materials having been introduced into the polymerization process as a support for the chromium oxide. Accordingly, the polymer produced is one which has incorporated in it, as a filler, some portion of the catalyst or its chromium-free support. The support material, which term as used herein means either silica, alumina, zirconia, thoria, or a combination of these materials, will be incorporated in the polymer to the extent of about 1 to about 10 percent by weight based upon the weight of the filled polymer. This is most feasibly accomplished by limiting the polymer production relative to the quantity of catalyst employed so that the polymer produced has the desired support concentration. This is conveniently effected by employing a low productivity catalyst having a concentration of from about 1 to about 1,000 p.p.m. by weight, preferably from about 15 to about 100 p.p.m. by weight chromium oxide on the support, thus limiting the production of the polymer to form about 10 to about 100 pounds of polymer per pound of catalyst, under which conditions the optimum support content is incorporated in the finished polymer.

The specific amount of chromium to be associated with the support material to obtain a desired filler level within the polymer will depend upon a number of factors including the nature of the olefin monomer, the choice of support, the catalyst activation procedure, the polymerization temperature, and the poison level of the system. Such considerations are well within the skill of those in the art and the proper conditions can be determined easily by routine tests.

The polymer, after it has been formed into an article, is conditioned with an acid chromate etch and a hydrofluoric acid treatment; the conditioned plastic article is then preplated with an electrolessly platable metal and electroplated.

The acid chromate etch is that conventionally employed in metal plating and can be preceded or followed by the hydrofluoric acid treatment. The latter involves any treatment whereby the surface of the plastic article is contacted with hydrogen fluoride. Aqueous solutions of hydrofluoric acid or acid fluoride salts can be employed. Suitable acid salts are those of the formula $MF_x\cdot(HF)$ wherein M is the ammonium ion or a metal such as the alkali metals, alkaline earth metals, and the like, and $x$ is the valence of M.

The method of pretreating and etching the polymer-contained article can be done according to the following procedure:

1. Immerse the article in a sodium pyrophosphate cleaning solution for 2 to 5 minutes at 140° F.;
2. Immerse in a sodium bisulfate neutralizing solution for 15 to 30 seconds at 75° F.;
3. Immerse in an acid chromate etching solution for 0.1 to 20 minutes at 75° to 200° F.;
4. Etch with a water-soluble acid fluoride salt in an aqueous solution having a concentration of about 0.1 weight percent to saturation, preferably 1.0 weight percent to saturation, for about 2 minutes at room temperature;
5. Subject to conventional electroless plating such as with copper and/or nickel-containing solutions; and
6. Electroplate the now electrically conductive article using any combination of conventional plating solutions and techniques.

According to the method of this invention, the particle-form olefin polymerization process was performed employing ethylene as the olefin in a hydrocarbon medium of isobutane, employing a catalyst comprising 0.002 weight percent chromium as chromium oxide on a silica support. Polymerization operations were conducted for 90 minutes at 550 p.s.i.g. at a reaction temperature of 220° to 230° F. Productivity was 38 pounds of polymer per pound of catalyst. The catalyst residue was retained in the polymer to the extent of producing a first polymer containing 2.6 weight percent silica.

A second polymer was prepared in two batches and in substantially the same manner as was the first polymer but with catalyst comprising about 1.9 weight percent chromium as chromium oxide on the silica support. The average productivity of these batches was about 3350 lbs./lb. catalyst and the particle-form polymer had a silica content of 0.02 weight percent. This product was then mixed and blended in the molten state with chromium-free silica filler to produce a second polymer having a silica content of 2.6 weight percent.

The first and second polymers were then similarly molded into test slabs which were then treated for 2 minutes at 155° F. with an acid chromate etching solution consisting of 283 ml. of water, 45 grams chromium trioxide, and 918 ml. of 96 percent sulfuric acid, 300 ml. of 85 percent phosphoric acid and 0.2 grams of a wetting agent. Thereafter, both polymers were etched for 2 minutes at room temperature in a bath containing 25 percent by weight ammonium bifluoride.

Thereafter, both polymers were plated in a conventional sequence of electroless copper plating, electroless nickel plating, and electrolytic copper plating in a copper strike bath of conventional composition under identical conditions.

Adhesion values were then determined for both polymers on an Instron tester at a 90° angle at a rate of 2 inches per minute under conventional testing methods, and the force required to separate the metal layer from the polymer per lineal inch of contact between the metal and the polymer was determined. Results were as follows:

| Polymer No. | Polymerization process, weight percent | | Plated polymer, wt. percent silica in polymer | Adhesion, lbs./in. |
| --- | --- | --- | --- | --- |
| | Chromium oxide on silica | Silica in polymer | | |
| 1 | 0.002 | 2 6 | 2.6 | 3.0 |
| 2 | 1.9 | 0.02 | 2.6 | 1.8 |

The above data indicate the operability of the method of this invention. In addition, they indicate that the inclusion of the support in the polymer during the formation of the polymer results in a greater adhesion strength of the electroplated metal to the polymer than does the incorporation of the same amount of support, by extraneous methods, after the formation of the polymer.

It will be appreciated that while the foregoing has been phrased in terms of silica, silica catalyst and siliceous materials, any one of the conventional supports of silica, alumina, zirconia, and thoria, can be employed in the method of this invention.

From the above it will be evident that various modifications can be made to the method of this invention. Such, however, are considered as being within the skill of the art.

What is claimed is:

1. A method of producing an electroplated polymer which comprises:
   a. polymerizing at least one olefin in the presence of a particulate polymerization catalyst comprising chromium oxide and a support selected from the group consisting of silica, alumina, zirconia, thoria, and their combinations to produce a polymer product having said support incorporated therein in an amount from about 1 to about 10 percent by weight of said polymer product;
   b. recovering said polymer product;
   c. etching the catalyst on the surface of said polymer product by contacting the surface of said polymer product with an aqueous-soluble fluoride to produce a polymer having an electroplatable surface; and,
   d. electroplating the polymer.

2. The method of claim 1 in which said polymer product is recovered in the form of solid particles from the medium in which the polymerization is conducted.

3. The method of claim 1 in which the catalyst comprises a support containing at least one but less than 1,000 parts per million by weight chromium oxide, calculated as the metal.

4. The method of claim 1 in which production of the polymer product is from about 10 to about 100 pounds per pound of catalyst.

5. The method of claim 1 in which ethylene is polymerized in the presence of a catalyst comprising about 0.002 weight percent chromium oxide on silica, at a production rate of about 38 pounds of polymer per pound of catalyst, said catalyst being incorporated in said polymer in an amount of about 2.6 weight percent, said polymer being recovered in the form of solid particles.

6. The method of claim 1 in which the polymerization catalyst comprises chromium oxide on silica.

7. The method of claim 6 in which the chromium oxide is contained on the silica in a concentration of from about 10 to about 30 parts per million by weight of the silica.

* * * * *